Patented Aug. 19, 1941

2,253,167

UNITED STATES PATENT OFFICE 2,253,167

SULPHUR DYESTUFF

Newell M. Bigelow and John Elton Cole, Wilmington, Del., assignors to E. I. du Pont de Nemours & Company, Wilmington, Del., a corporation of Delaware No Drawing. Application February 24, 1939, Serial No. 258,173

10 Claims. (Cl. 260—134)

This invention relates to new sulphur dyestuffs, and especially to sulphur dyes which are produced by the thionation of compounds represented in general by the formula

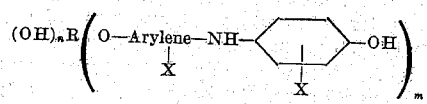

in which R contains 2 to 6 carbons and is a straight or branched chain alkylene radical or a cycloalkylene radical. Arylene is a single ring aromatic nucleus of the benzene series. Arylene and the benzene nucleus may be substituted one to four times by one or any combination of the group consisting of hydrogen, methyl, ethyl, propyl, the corresponding alkoxy groups or halogen and these nuclei may be substituted alike or dissimilarly, $n$ is 1 to an integer one less than the number of carbons in R and $m$ is 1 or 2.

Compounds made by thionating 4-(alkoxy)-4'-hydroxy-diphenylamines are known. The properties of these dyes are such that great care must be taken to avoid as much as possible the presence of undissolved particles and tarry lumps in the dyebaths. Although the thionated products of the prior art mentioned can be oxidized by the action of air on the fiber, the rate of oxidation is commonly so slow that the dyed fiber requires a chemical after-treatment with oxidizing agents, such as sodium perborate or sodium peroxide in order to develop the color within a period of time that can be allowed for this purpose in practical dyeing. In general sulphur dyes are used where low cost dyeings are desired. They are commonly used to dye relatively heavy weight or low-cost materials, large dyebaths are used and their successful use depends to a large extent on low cost handling of the material. Accordingly a dye which will avoid specky dyeings and will enable rapid and complete solution of the dye is of great practical importance. The prior art dyes of the type mentioned give more or less specky dyeings and they are not as fast to bleaching agents as has been desired.

It is among the objects of this invention to provide sulphur dyes which are readily and completely soluble, which are relatively oxidizable by the action of the air when dyed on the fiber and which will produce non-specky dyeings. Another object of the invention is to provide sulphur dyes with improved fastness to bleaching agents. Other objects of the invention will be apparent from the following description.

The objects of the invention may be attained in general by thionating a hereinbefore described compound represented by the formula

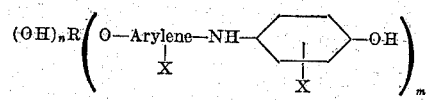

by heating it with a polysulphide of an alkali metal in a basic medium containing water and an inert water soluble organic solvent, such as an aliphatic alcohol, cyclohexanol or a mono-alkyl-ether of ethylene glycol. The thionation mixture is boiled and refluxed until the compound is thionated. The thionated product is precipitated out of the reaction medium by suitable means and separated therefrom.

The invention will be more fully set forth in the following more detailed description which includes examples that are given as illustrative embodiments of the invention and not as limitations thereof.

EXAMPLE 1

*The thionation of 4-(beta-hydroxy-ethoxy)-4'-hydroxy-diphenylamine*

The reactions described in the following illustrations of the invention were carried out in a gas-tight reaction vessel constructed of stainless steel or glass, which was capable of being heated and was equipped with an agitator, a thermometer and a return condenser. The upper end of the return condenser was fitted with a scrubber for the disposal of the hydrogen sulphide which was generated during the thionations. All parts are expressed in parts by weight unless otherwise specified.

The thionating vessel was charged with 1.5 parts of the mono ethyl ether of ethylene glycol and 3.5 parts of water. Two and three-tenths parts of sodium hydroxide were dissolved in this mixture. When this was in solution, 4.6 parts of sulphur were added. The resulting mixture was refluxed, with good agitation, until all of the sulphur had gone into solution. Then one part of 4-(beta-hydroxy-ethoxy)-4'-diphenylamine was added. The resulting mixture was boiled and refluxed, with agitation, for 40 hours.

At the end of this time the reaction mixture was transferred to an open vessel, diluted and heated to about 80° C. The mixture was agitated, and a brisk current of air, in finely divided bubbles, was blown through the suspension. From time to time sodium hydroxide was added to the suspension as the sodium hydroxide became exhausted. The pH value of the solution was kept between 8.5 and 10.5 during the aeration.

When all of the crude dye had been precipitated and all of the sodium polysulphide had been converted to sodium thiosulphate, the suspension was filtered. The filter cake of crude dye was washed, first with 10% sodium chloride solution until the filtrate was neutral to phenolphthalein, and then with a small amount of cold water. The crude dye was dried in a vacuum oven at 50°–70° C. Approximately 1.8 parts of dye were obtained. This was diluted to a standard strength by mixing it with solid sodium chloride or sodium carbonate.

The dye dissolved readily and completely in warm dilute sodium sulphide solution, yielding an olive green solution. Cotton fibers, dyed in this solution and then stirred for a few minutes in a warm solution of sodium perborate, were dyed an attractive non-specky bordeaux shade. These dyeings possessed an excellent fastness to light, laundering and chlorine.

EXAMPLE 2

*The thionation product of 4-(mono-hydroxy-propoxy)-4'-hydroxy-diphenylamine*

A solution of sodium polysulphide was prepared, according to the method employed in Example 1, from 2.0 parts of the mono ethyl ether of ethylene glycol, 3.0 parts of water, 1.9 parts of sodium hydroxide and 4.5 parts of sulphur. To this was added 1.0 part of 4-(mono-hydroxy-propoxy)-4'-hydroxy-diphenylamine. The mixture was boiled and refluxed, with agitation, for 40 hours.

At the end of this time the reaction mixture was transferred to an open vessel, diluted with water and heated to about 85° C. Sodium bisulphite was added to the hot agitated solution until it was only faintly alkaline to Brilliant Yellow paper. Then sodium sulphite was added slowly to the mixture until the outspread from a spot of the suspension on filter paper was colorless or only slightly brown. The suspension was then cooled to 50° C. and filtered. The filter cake was washed, first with 15% sodium chloride solution and finally with a small amount of cold water. The product was dried in a vacuum oven at 45°–75° C.

This dye dissolved readily and completely in a warm dilute sodium sulphide solution, forming a brownish green solution. Cotton goods, immersed in this bath, rinsed, and after-treated in a warm solution of sodium perborate or hydrogen peroxide, were dyed an attractive non-specky bordeaux shade, redder and deeper than the dyeings mentioned in the first example. The fastness of the dyeings to laundering, light and bleaching agents was satisfactory.

EXAMPLE 3

*The thionation product of 4-(beta:gamma-dihydroxy-propoxy)-4'-hydroxy-diphenylamine*

A solution of sodium polysulphide was prepared in the manner described in Example 1 from 2.0 parts of ethyl alcohol, 2.0 parts of water, 2.2 parts of sodium hydroxide and 4.1 parts of sulphur. To the prepared solution 1.0 part of 4-(beta:gamma-dihydroxy-propoxy)-4'-hydroxy-diphenylamine was added. The mixture was refluxed for 100 hours. At the end of this time the solution was diluted and aerated at 85° C. and a pH of 8.5 to 10.0 maintained until all of the polysulphide had been converted to thiosulphate and all of the dye had been precipitated. The aeration was then continued for several hours. Then the reaction mixture was filtered. The filter cake was washed with 15% sodium chloride solution until the washings were neutral to phenolphthalein, and then with a little cold water. The crude product was dried at 59° C. in a vacuum oven.

This dye dissolved in hot sodium sulphide, giving an olive green solution. Cotton goods immersed in this bath and then developed in air were dyed a non-specky reddish brown shade which possessed satisfactory fastness to light, bleaching agents and laundering.

EXAMPLE 4

*The thionation product of 4-(beta-hydroxy-isobutoxy)-4'-hydroxy-diphenylamine*

A solution of sodium polysulphide was prepared, in the manner described in the first example, from 1.0 part of Cellosolve, 3.0 parts of water, 1.8 parts of sodium hydroxide and 3.3 parts of sulphur. To the polysulphide was added 1.0 part of 4-(beta-hydroxy-isobutoxy)-4'-hydroxy-diphenylamine. The mixture was refluxed for 40 hours. At the end of this time the mixture was transferred to an open vessel and diluted with 5.0 parts of water. Four parts of sodium hydroxide were added, and the resulting solution was heated to boiling for three hours. Evaporation losses were made up with water.

At the end of this time, the solution was chilled to about 0°–5° C. in an ice bath. Concentrated hydrochloric was added, so slowly that the temperature of the reaction mixture did not rise above 15° C., until the solution was neutral to phenolphthalein. The insoluble product was filtered off and washed well first with 15% sodium chloride solution and finally with a small amount of cold water. The crude product was dried at 50° C. in an oven.

The dye so obtained was soluble in warm sodium sulphide solution, with the formation of a greenish-brown vat. Cotton goods immersed in this dye bath, then rinsed and developed in a warm solution of sodium perborate, hydrogen peroxide or acidified dichromate, were dyed an attractive non-specky shade of bordeaux possessing excellent fastness properties.

EXAMPLE 5

*The thionation product of 4-(beta-hydroxy-ethoxy)-4'-hydroxy-3'-methyl-diphenylamine*

A solution of sodium polysulphide was prepared in the usual manner from 1.0 part of Cellosolve, 0.8 part of water, 3.2 parts of crystalline sodium sulphide and 3.0 parts of sulphur. The mixture was refluxed until the solution of the sulphur was completed; then 1.0 part of 4-(beta-hydroxy-ethoxy)-4'-hydroxy-diphenylamine was added. The resultant mixture was refluxed for 40 hours. At the end of this time the reaction mixture was transferred to an open vessel, diluted and aerated at 85° C. and at a pH of 8.5–10.0, as previously described. When the aeration was complete and all the color precipitated, the product was filtered and washed on the filter, first with water and finally with brine. The dye then was suspended in 5 parts of water at 40°–70° C. One-third of one part of sodium perborate was added to the suspension, which then was agitated vigorously at a temperature between 40° and 70° C. for an hour. The product was filtered again, washed with brine and then with a small amount of cold water, and dried at atmospheric pressure at 45° C.

The resulting dye dissolved readily in warm dilute sodium sulphides. Cotton goods immersed in this dye bath and developed in the air were dyed a non-specky reddish brown color. The fastness of these dyeings to light, chlorine and laundering was satisfactory.

EXAMPLE 6

*The thionation product of 1:3-di-(4'-(4''-hydroxy-anilido)-phenoxy)-2-hydroxy-propane*

A solution of sodium polysulphide was prepared

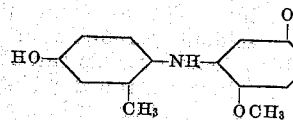

in the usual manner from 2.0 parts of water, 3.0 parts of the mono ethyl ether of ethylene glycol, 2.1 parts of sodium hydroxide and 4.5 parts of sulphur. To this mixture was added 1.0 part of 1:3 - di-(4'-(4''-hydroxy - anilido)-phenoxy)-2-hydroxy-propane. The mixture was refluxed for 50 hours. At the end of this time the reaction mixture was diluted and aerated at a temperature of 80°–90° C. and a pH of 8.5–10.0 until all of the polysulphide had been converted into thiosulphate and all of the dye had been precipitated. The aeration was continued for several hours beyond this point; then the product was filtered off, washed and dried in the usual manner.

The product was readily soluble. When applied to cotton goods from a sulphide bath, it gave brown non-specky dyeings of good fastness to laundering and to light.

As illustrative of other intermediates from which the compounds of the invention are produced by processes similar to the processes of the examples are mentioned those represented generally by the formula

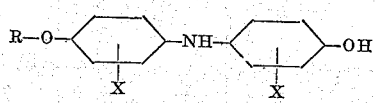

in which R is β-hydroxy-ethyl, β-hydroxy-propyl, β:γ-dihydroxy-propyl, β - hydroxy - isobutyl, alpha-hydroxy-cyclohexyl or sorbityl radical; compounds represented generally by the formula

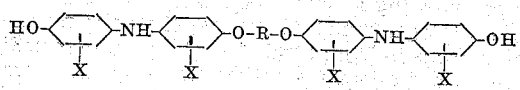

in which R is a beta-hydroxy propylene group or an alpha-hydroxy cyclohexylene group. Other illustrations are 4-(beta-hydroxy ethoxy)-2-methoxy-4'-hydroxy diphenylamine

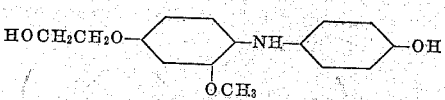

4-(beta-hydroxy ethoxy) - 2-propyl - 4'- hydroxy diphenylamine, 4-(beta - hydroxy)-2 - chloro-4'- hydroxy diphenylamine, 4-(beta-hydroxy isobutoxy)-3'-methyl-4'-hydroxy diphenylamine

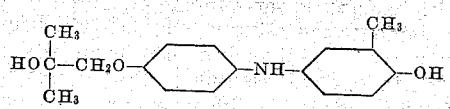

4 -(beta - hydroxy isobutoxy)-3'-methoxy-4'-hydroxy diphenylamine, 4-(beta-hydroxy isobutoxy)-3'-chloro-4'-hydroxy diphenylamine, 2,5-dimethyl -4-(beta - hydroxy propoxy)-2',5' - dimethyl-4'-hydroxy diphenylamine,

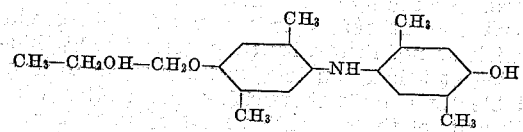

1:3-di-(4'(4''-hydroxy-3''-methyl) anilido-2':5'-dimethoxy)-2-hydroxy propane

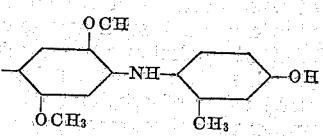

1:2:5:6:1':2':5':6'-octamethyl-4-(β-γ-dihydroxy propoxy)-4'-hydroxy diphenylamine

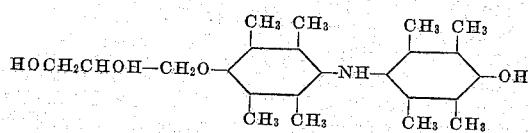

1:2:5:6:1':2':5':6'- octachloro-4-(β-γ-dihydroxy propoxy-4'-hydroxy diphenylamine, 1:2:5:6-tetramethyl-2'-chloro-4-(β-γ-dihydroxy propoxy)-4'-hydroxy diphenylamine, 4-(Δ-hydroxy amyloxy)-4'-hydroxy diphenylamine

4-(Δ-hydroxy amyloxy)-2-methyl-4'-hydroxy diphenylamine, 4-(γ:δ-dihydroxy amyloxy)-4'-hydroxy diphenylamine

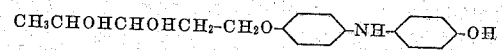

and the X-substituted compounds of this type, 4-sorbitoxy-4'-hydroxy:diphenylamine

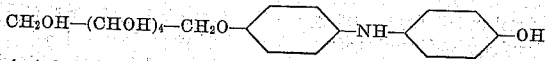

4-(alpha-hydroxy cyclohexoxy)-4'-hydroxy diphenylamine

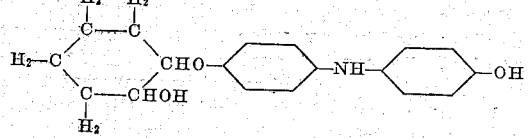

and many other substituted compounds of these types as hereinbefore described.

The thionated products are much more easily oxidized on the fiber and the dyeings are more fast to bleaching agents than thionated alkoxy-diphenylamines which have no hydroxy groups. The thionated products oxidize on the fiber to give non-specky dyeings. It is our present opinion that the improved dyeings are due to the uniform and active solubility and oxidizability of the dyestuffs but it is to be understood that all the precise reasons for improved results are unknown to applicants and the invention is not to be limited by the suggested theory. The new products have greatly improved working properties.

The thionation medium may consist of the polysulphide in water or in a mixture of water with an inert liquid water soluble organic solvent consisting of water with traces to 99.9% of the inert solvent. Any amount of thionation medium can be used which is sufficient to act as a carrier between the alkali metal polysulphide and the material to be thionated. Mono-alkyl ethers of ethylene glycol are among the most satisfactory inert organic solvents but many others such as alcohols and cyclohexanol can be used. In the specification and claims, the term inert solvent refers to water soluble solvents which do not react with the material to be thionated at thionation temperatures so as to form stable compounds therewith or with other constituents of the thionation mixture so as to prevent thionation.

We prefer to use thionation media consisting of water and about 10% to about 90% of an aliphatic alcohol, such as one consisting essentially of ethyl alcohol or a mono-alkyl ether of ethylene glycol, such as that consisting essentially of the ethyl ether of ethylene glycol. Among these we prefer a reaction medium consisting of water and about 28% of the mono ethyl ether of ethylene glycol, say 1 part of the mono-ethyl ether of ethylene glycol and 2.5 parts of water.

Besides the inert solvent, the thionation mixture contains a polysulphide of an alkali metal and the material to be thionated. The polysulphide is represented by the formula $Na_2S_x$ in which $x$ is at least 4. Any amount of sulphur in excess of the indicated proportion up to the limit of stability of the alkali metal polysulphides in the thionating medium can be present. About 4.6 mols of a polysulphide corresponding approximately to the formula $Na_2S_{6.5}$ is preferred. The thionation mixture may contain any proportion of the polysulphide which is sufficient to effect thionation. The polysulphides are conveniently prepared from sodium sulphide and sulphur or from sodium hydroxide and sulphur. The thionation mixture may contain adventitious non-reactive compounds such as sodium carbonate.

The intermediate to be thionated may be added to the thionation mixture in various forms such as the hydroxy-diarylamine, its oxidized or indophenol form or an alkali metal salt of the hydroxy-diarylamine. In whatever form the intermediate is added, the process of thionation described herein produces the same thionated product.

The constituents of the thionation mixture may be mixed in any order. The thionations are satisfactorily carried out at atmospheric pressures but can be carried out at pressures of a few inches of mercury higher or lower than normal atmospheric pressures. The completion of thionation is ordinarily determined by investigation of test samples drawn from the thionation mixtures.

The thionated product can be separated from the thionation mixture by various methods, such as aeration of the basic medium which oxidizes the alkali metal polysulphide, the addition of alkali metal hydroxide to convert the polysulphide to sulphide followed by addition of a neutralization agent, conversion of the alkali metal polysulphide to thiosulphate by reacting with a soluble sulphite or bisulphite or by conversion of the polysulphide to sulphide followed by evaporation of the resulting mixture to dryness. The thionated product can be separated by any of these processes but we prefer to employ an aeration process. These precipitated thionated products have better solubility and the dyeings have better fastness than the prior art products heretofore mentioned.

The preferred form of the product is produced by a controlled oxidation of the precipitated product which may be done by adding controlled amounts of a soluble oxidizing agent to the suspension or by aerating the thionated compound while it is suspended in a liquid medium. The medium may be that resulting from adjusting the medium to a pH value of about 8.5 to 10.5 after the thionation mixture is rid of the alkali metal polysulphide, or the thionated material can be isolated as by filtration, re-suspended in an aqueous medium and then treated with the oxidizing agent. The suspension can be treated with air, hydrogen peroxide or a perborate or hypochlorite of an alkali metal, for example sodium perborate or hypochlorite, but other oxidizing agents can be used.

The controlled oxidation or conditioning of the thionated products is carried on until a test dyeing made with the product in process will reach a shade in air in 5 to 10 minutes which is produced on a like dyeing in the same time by the action of a solution of sodium perborate of about 3% strength. Without impairing the solubility or fastness of the thionated products, any soluble oxidizing agent can be used to condition the thionated compounds. When the thionated precipitated compound is filtered from the original medium, resuspended in water and then conditioned, the dyeings made with these products have the superior oxidizing properties in air and they have somewhat brighter shades. Processes giving brighter shades are generally preferred. Aeration is the preferred method of oxidation since it has been found that with aeration the process is more easily controlled.

As described in our copending application Serial No. 258,172, the intermediates for thionation may be made by heating together until condensation has taken place, a hydroquinone, an inorganic hydrochloride catalyst, such as zinc or iron chloride and a compound represented by the formula

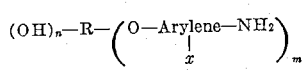

in which R is a straight or branched chain alkyl radical having 2 to 6 carbons or a 4 to 6 carbon cycloalkyl radical, Arylene is a nucleus of the benzene series, $x$ is one to four members or any combination of two to four members of the group consisting of hydrogen, methyl, ethyl, propyl, the corresponding alkoxy groups and halogen, $n$ is 1 to an integer which is one less than the number of carbons in R and $m$ is 1 or 2. The intermediates are made by starting with arylene compounds having two hydroxy-ether groups as well as with those which have only one. Upon condensation with a hydroquinone which is unsubstituted or one which is substituted by a substituent having the value of $x$ water is split off, thereby producing intermediates represented by the following formula

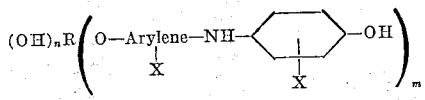

in which $m$ is 1 or 2. A suitable temperature for condensation is about 170° C. to about 220° C. but higher and lower temperatures can be used. The condensation mixture may contain approximately equimolecular proportions of the compounds to be condensed or a slight excess of the Arylene compound. The products of condensation may be separated from the condensation mixture by any suitable means.

These intermediates may be quite easily oxidized by atmospheric oxygen, producing compounds represented generally by the formula

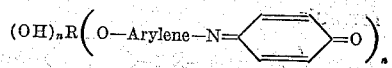

For this reason it is desirable to thionate the intermediates soon after they are prepared or protect the condensation product from excessive oxidation. The condensation product may be isolated in its acidic form or in the form of any of its alkali metal salts. Either form of the condensation product is suitable as a starting material for making the thionated products of the present invention.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:

1. A sulphur dye resulting from the thionation of one of a group consisting of an alkali metal salt of a compound and a compound represented by the formula

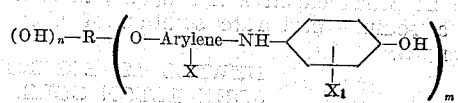

in which R is a radical having 2 to 6 carbons of the group consisting of straight chain alkyl, branched chain alkyl and cycloalkyl; Arylene is a radical of the benzene series; X and $X_1$ are each at least one of a group consisting of hydrogen, methyl, ethyl, propyl, the corresponding alkoxy groups and halogen; $n$ is 1 to an integer one less than the number of carbons in R; and $m$ is an integer not greater than 2.

2. A sulphur dye resulting from the thionation of one of a group consisting of an alkali metal salt of a compound and a compound represented by the formula

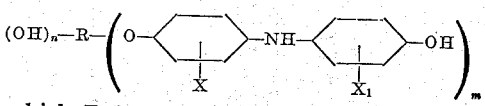

in which R is a radical having 2 to 6 carbons of the group consisting of straight chain alkyl, branched chain alkyl and cycloalkyl; and X and $X_1$ are each at least one of a group consisting of hydrogen, methyl, ethyl, propyl, the corresponding alkoxy groups and halogen, $n$ is 1 to an integer which is one less than the number of carbons in R and $m$ is an integer not greater than 2.

3. A sulphur dye resulting from the thionation of one of a group consisting of the compound 4-(beta-hydroxy-ethoxy)-4'-hydroxy-diphenylamine and the alkali metal salts of said compound.

4. A sulphur dye resulting from the thionation of one of a group consisting of the compound 4-(beta-hydroxy-propoxy)-4'-hydroxy-diphenylamine and the alkali metal salts of said compound.

5. A sulphur dye resulting from the thionation of the compound 4-(gamma-hydroxy-propoxy)-4'-hydroxy-diphenylamine.

6. The process which comprises thionating in a thionating medium one of a group consisting of an alkali metal salt of a compound represented by the following formula, the indophenol of said compound, and a compound represented by the formula

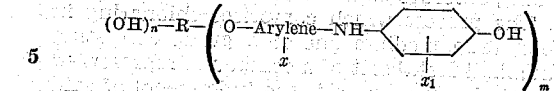

in which R is a radical having 2 to 6 carbons of the group consisting of straight chain alkyl, branched chain alkyl and cycloalkyl; Arylene is a radical of the benzene series; $x$ and $x_1$ are each at least one of a group consisting of hydrogen, methyl, ethyl, propyl, the corresponding alkoxy groups and halogen; $n$ is 1 to an integer one less than the number of carbons in R; and $m$ is an integer not greater than 2; said thionating medium comprising water and a polysulphide represented by the formula $Na_2S_x$ wherein $x$ is at least 4; heating in said medium until the compound is thionated and then precipitating the thionated product.

7. The process which comprises thionating in a thionating medium one of a group consisting of an alkali metal salt of a compound represented by the following formula, the indophenol of said compound, and a compound represented by the formula

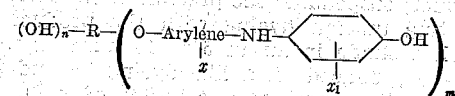

in which R is a radical having 2 to 6 carbons of the group consisting of straight chain alkyl, branched chain alkyl and cycloalkyl; Arylene is a radical of the benzene series; $x$ and $x_1$ are each at least one of a group consisting of hydrogen, methyl, ethyl, propyl, the corresponding alkoxy groups and halogen; $n$ is 1 to an integer one less than the number of carbons in R; and $m$ is an integer not greater than 2; said thionating medium comprising water and a polysulphide represented by the formula $Na_2S_x$ wherein $x$ is at least 4; heating in said medium until the compound is thionated; precipitating the thionated product; and then acting on said precipitate with an oxidizing agent until a dyeing with the product will reach a shade in air in 5 to 10 minutes which will be produced by a sodium perborate solution of about 3% strength in said time on a like dyeing.

8. The process which comprises thionating in a thionating medium one of a group consisting of an alkali metal salt of a compound represented by the following formula, the indophenol of said compound, and a compound represented by the formula

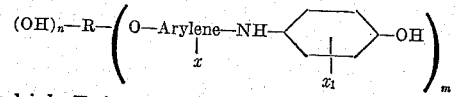

in which R is a radical having 2 to 6 carbons of the group consisting of straight chain alkyl, branched chain alkyl and cycloalkyl; Arylene is a radical of the benzene series; $x$ and $x_1$ are each at least one of a group consisting of hydrogen, methyl, ethyl, propyl, the corresponding alkoxy groups and halogen; $n$ is 1 to an integer one less than the number of carbons in R; and $m$ is an integer not greater than 2; said thionating medium comprising water and a polysulphide represented by the formula $Na_2S_x$ wherein $x$ is at least 4; heating in said medium until the compound is thionated; precipitating the thionated product; suspending the precipitate in water and acting thereon with an oxidizing agent until a dyeing with the product will reach a shade in air in 5 to 10 minutes which will be produced on a like dyeing in said time by a sodium perborate solution of about 3% strength.

9. The process which comprises thionating in a thionating medium one of a group consisting of an alkali metal salt of a compound represented by the following formula, the indophenol of said compound, and a compound represented by the formula

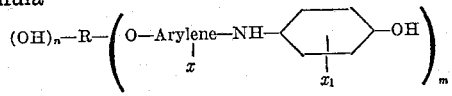

in which R is a radical having 2 to 6 carbons of the group consisting of straight chain alkyl, branched chain alkyl and cycloalkyl; Arylene is a radical of the benzene series; $x$ and $x_1$ are each at least one of a group consisting of hydrogen, methyl, ethyl, propyl, the corresponding alkoxy groups and halogen; $n$ is 1 to an integer one less than the number of carbons in R; and $m$ is an integer not greater than 2; said thionating medium comprising water and a polysulphide represented by the formula $Na_2S_x$ wherein $x$ is at least 4; heating in said medium until the compound is thionated; precipitating the thionated product; suspending the precipitate in water and aerating until a dyeing with the product will reach a shade in air in 5 to 10 minutes which will be produced on a like dyeing in said time by a sodium perborate solution of about 3% strength.

10. A process which comprises thionating in a thionating medium one of a group consisting of an alkali metal salt of a compound represented by the following formula, the indophenol of said compound and the compound represented by the formula

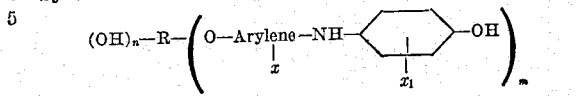

in which R is a radical having 2 to 6 carbons of the group consisting of straight chain alkyl, branched chain alkyl and cycloalkyl; Arylene is a radical of the benzene series; $x$ and $x_1$ are each at least one of a group consisting of hydrogen, methyl, ethyl, propyl, the corresponding alkoxy groups and halogen; $n$ is 1 to an integer one less than the number of carbons in R; and $m$ is an integer not greater than 2; said thionation medium containing per mol of said compound about 4.6 mols of an alkali metal polysulphide having a formula $Na_2S_x$ in which $x$ is 4 to about 6.5 and an aqueous mixture containing about 10% to about 90% of a mono alkyl ether of ethylene glycol; heating in said medium until the compound is thionated; precipitating the thionated product; resuspending the precipitate in water and aerating until a dyeing with the product will reach a shade in air in 5 to 10 minutes which will be produced on a like dyeing in said time by a sodium perborate solution of about 3% strength.

NEWELL M. BIGELOW.
JOHN ELTON COLE.